United States Patent [19]

Lichtner et al.

[11] 4,409,192
[45] Oct. 11, 1983

[54] GAS SCRUBBING METHODS

[75] Inventors: Frederick W. Lichtner, Richboro; Jean T. Rose, Fairless Hills, both of Pa.

[73] Assignee: Betz Laboratories, Inc., Trevose, Pa.

[21] Appl. No.: 371,403

[22] Filed: Apr. 26, 1982

[51] Int. Cl.³ .............................................. C01B 17/00
[52] U.S. Cl. .................................... 423/242; 423/243; 252/180
[58] Field of Search .......... 423/242 A, 242 R, 244 A, 423/244 R, 243; 252/180

[56] References Cited

U.S. PATENT DOCUMENTS

| | | | |
|---|---|---|---|
| 3,630,937 | 12/1971 | Baum et al. | 210/698 X |
| 3,801,699 | 4/1974 | Arnold | 252/180 |
| 3,880,620 | 4/1975 | Lange et al. | 252/180 |
| 4,342,733 | 8/1982 | Skelhammer et al. | 423/242 |

*Primary Examiner*—Gregory A. Heller

*Attorney, Agent, or Firm*—Alexander D. Ricci; Bruce E. Peacock

[57] ABSTRACT

The present invention is directed to a method of removing sulfur dioxide from flue gases derived from furnaces burning high sulfur content fuels. The method comprises spraying flue gases with an aqueous medium containing (i) a material either dissolved or slurried therein, which material reacts with the sulfur dioxide in the flue gas to produce calcium sulfate and calcium sulfite, and (ii) a composition comprising a substantially linear water-soluble sulfonated polystyrene, and an organophosphonic acid derivative having the structural formula $(X)_2N-R-N(X)_2$ where R is a lower alkyl of from 1 to 7 carbon atoms, X is hydrogen or the group —$CH_2PO_3M_2$, where M is a water-soluble cation, the compound being further characterized in that at least one but preferably all X's are —$CH_2PO_3M_2$. In certain instances it is desirable to use in conjunction with the invention a water-soluble lignosulfonate.

11 Claims, No Drawings

GAS SCRUBBING METHODS

The present invention is directed to a method of removing sulfur dioxide from flue gases derived from furnaces burning high sulfur content fuels. The method comprises spraying flue gases with an aqueous medium containing (i) a material either dissolved or slurried therein, which material reacts with the sulfur dioxide in the flue gas to produce calcium sulfate and calcium sulfite, and (ii) a composition comprising a substantially linear water-soluble sulfonated polystyrene, and an organo-phosphonic acid derivative having the structural formula $(X)_2N-R-N(X)_2$ where R is a lower alkyl of from 1 to 7 carbon atoms, X is hydrogen or the group $-CH_2PO_3M_2$, where M is a water-soluble cation, the compound being further characterized in that at least one but preferably all X's are $-CH_2PO_3M_2$. In certain instances it is desirable to use in conjunction with the invention a water-soluble lignosulfonate.

BACKGROUND OF THE INVENTION

During recent years, the number of wet scrubber systems installed to remove gaseous and particulate material from stack gases has increased tremendously. These wet scrubbers are being used to clean effluent from boiler stacks, incinerator stacks, lime kilns, foundries, blast furnaces, basic oxygen furnaces (BOF), open hearth units, coke plants, paper mill recovery boilers, pet food manufacturing facilities, electric furnaces (steel and aluminum), smelters, asphalt plants and many others.

One of the most important features of a scrubber system is the contact chamber, the device used to effect transfer of gaseous and/or particulate matter from the gas to the liquid phase. Most wet scrubber systems involve a venturi, a packed bed, an orifice plate, a spray chamber or a turbulent bed. Some systems even use two contact chambers in series, for example, a venturi followed by a spray chamber.

Venturi or orifice plate scrubbers are generally more efficient for particulate removal while packed beds, turbulent beds and spray chambers are usually more efficient for removing gaseous components such as $SO_2$ and HF.

The present invention is directed specifically to those scrubber systems where scaling and deposition problems due to insoluble calcium sulfate and calcium sulfite are encountered. The type of problem which the present invention minimizes is that which is usually found in gas scrubber systems of utility boilers, incinerators or for that matter any furnace or boiler system where high sulfur fuels are used and, in particular where the scrubber systems utilize a wet lime or limestone process.

The flue gas generated by a utility boiler for example contains in addition to the fly ash, pollutant $SO_2$ and $SO_3$ gases. These components must be removed before the flue gas is discharged into the atmosphere. Various systems have been used for this purpose, among which may be mentioned the wet sodium carbonate and the wet lime and limestone scrubber systems. In both of these systems calcium sulfate and calcium sulfite formation can be a problem. With the use of lime and limestone, the formation of the calcium sulfate is a necessary requirement for the scrubber system to be effective.

In these systems, lime and limestone is added to the scrubber in slurry form. The limestone slurry is stored in a recycle tank which supplies the absorber tower pumps. These pumps supply the limestone slurry to the top of the absorber tower. The slurry is allowed to cascade downward as the incoming flue gas moves upward. Ideally, turbulent contact between the slurry and gas should be maximized and efficient $SO_2$ removal should occur.

Sulfur oxides are absorbed and precipitated as calcium salts which, after being separated from the liquid, are either discarded as solid waste or sold for use as wall board fillers and other recycle products. The water which is saturated with respect to calcium sulfite and sulfate is recycled. Closed-loop operation is desired to avoid the discharge of the high solids content water and to enhance $SO_2$ absorption. The closed-loop operation increases the scaling problem by increasing the supersaturation inside the lime or limestone scrubber. The scale usually consists of $CaSO_4$ and $CaSO_3$.

GENERAL DESCRIPTION OF THE INVENTION

It was determined that in order to permit the operation of a wet scrubber to continue as long as possible without shut-down for cleaning, etc., the calcium sulfate/sulfite scaling had to be controlled.

To achieve this the present inventors discovered that the addition of the hereafter described composition to the scrubbing solution not only increased scrubber effectiveness but also permitted the scrubbing operation to continue for periods which heretofore had not been possible.

The combination found to be effective for the purpose comprises a weight ratio of from about 1:10 to about 10:1, and preferably 1:7 to 7:1, of a water-soluble substantially linear sulfonated polystyrene having a molecular weight of from about 1,000 to 100,000 and preferably from 70,000 to 100,000, and an organo-phosphonate having the formula: $(X)_2N-R-N(X)_2$, where R is a lower alkylene of from 1 to 7 carbon atoms, and X is hydrogen or the group $-CH_2PO_3M_2$ where M is hydrogen or a water-soluble cation such as sodium, potassium or ammonium, the compound being further characterized in that at least one but preferably all X's are $-CH_2PO_3M_2$ groupings. Addition of this combination to the scrubbing medium in an amount of from 0.5 to about 300, and preferably from about 1 to about 75 ppm, effectively controlled the deposition of calcium sulfate and calcium sulfite so as to permit a more effective scrubbing operation. The polystyrene polymers found to be most effective were those which have been sulfonated to from about 50% to 100% with the greater degree of sulfonation being preferred. The phosphonates which possess enhanced activity are those having the shorter carbon chain as represented by R.

FIELD TRIAL

In order to establish the efficacy of the present invention a product having the following composition was actually added to the limestone slurry which was then used to scrub the effluent gas.

| By Weight | Product 1 |
|---|---|
| 7.88% | hexamethylene diamine tetra (methylene phosphonic) acid $(H_2O_3PCH_2)_2N-(CH_2)_6-N(CH_2PO_3H_2)_2$ |
| 5.0% | sulfonated polystyrene (90% sulfonation: molecular weight = 70,000) |
| 1.2% | sodium hydroxide (pH control) |

| Product 1 | |
|---|---|
| By Weight | |
| 85.92% | water |

The electric utility where the scrubber is located is a coal fired 400 MW generating station. There are four electrostatic precipitators for fly ash removal followed by four limestone scrubbers for $SO_2$ removal. The station has no bypass capability; therefore, when a scrubber unit is out of service for maintenance or repair, the station must de-rate approximately 25%. This, of course, costs the utility an enormous amount of money.

The purpose of the scrubbers at this utility is to reduce the concentration of sulfur dioxide in the boiler flue gas by 90–95%. Incoming $SO_2$ concentration is usually in the range of 2000–5000 ppm.

Limestone slurry is collected and stored in the recycle tank which supplies the absorber tower pumps. These pumps supply approximately 15,000 gpm of limestone slurry to the top of the absorber tower. The slurry cascades downward as the incoming flue gas moves upward. Ideally, turbulent contact between the slurry and gas should be maximized and efficient $SO_2$ removal should occur. The $SO_2$ combines with the calcium in the limestone slurry and forms calcium sulfite. A certain percentage of this calcium sulfite is oxidized to calcium sulfate, at a rate that is determined by excess air, temperature, pH and several chemical and kinetic factors. Blowdown at 223 gpm is taken off the recycle loop and the system is made up with fresh limestone slurry and clarifier overflow.

The flue gas then makes a 90° turn to pass through the demister section. Again ideally, this section should remove entrained moisture. Sprays are arranged to wash the demister panels for 5 minutes out of every 20 minutes to reduce deposition on these panels. The gas then passes to the stack and the demister wash water is collected and piped to the clarifier.

Prior to treatment with Product 1 (above described), each scrubber module was being taken out of service every 4–5 days for water blasting. The demister nozzles and panels would become partially plugged off in a short period of time and gas flow could not be maintained. During each outage, 2 men water blasted the unit for 8–16 hours. In addition, 5 to 100 demister spray nozzles were replaced due to total pluggage from calcium sulfate scale. Even with extensive water blasting, extensive sections of build-up remained on the walls of the unit.

Feed of Product 1 was initiated to one of the four modules. Approximately 30 ppm was fed to the demister spray water and approximately 10–15 ppm was shot fed to the absorber tower loop. Pictures of the internals prior to treatment with Product 1 were taken.

After one week of treatment with Product 1, the unit was opened for inspection and routine cleaning. During the week, the unit had not lost flow through the demister section and pressure drop through the demisters was approximately half that of the other three units. Deposition consisted of a very soft sludge and was only 25% of the usual accumulation. This soft sludge was easily water washed compared to the usual hard, tenacious calcium sulfate scale observed prior to chemical treatment. Quite a few spray nozzles were inspected—none were plugged with calcium sulfate. Whole sections of the unit's walls were cleaned down to bare metal—the usual hard "stalagmites and stalactites" type deposits were not in evidence.

Reaction of the utility personnel was quite favorable. Treatment with Product 1 on the remaining three modules was initiated shortly thereafter. Results have continued to be excellent.

What is claimed is:

1. In a process for scrubbing flue gases containing sulfur dioxide for the removal thereof which comprises (1) contacting the flue gases with an aqueous medium containing a material which will react with the sulfur dioxide to form either calcium sulfate or calcium sulfite or both; and (2) separating the insoluble either calcium sulfate or calcium sulfite or both from the aqueous medium, the improvement being adding to said aqueous medium prior to contact with the gas from about 0.5 to 300 parts per million of a combination of i. a water soluble sulfonated polystyrene, and
   ii. a compound having the formula: $(X)_2N-R-N(X)_2$, wherein R is a lower alkylene of from 1 to 7 carbon atoms, X is hydrogen or the group $-CH_2PO_3M_2$, where M is a water-soluble cation, the compound further characterized in that at least one and preferably all X's are $-CH_2PO_3M_2$.

2. A method according to claim 1 wherein the polystyrene and the compound are present in a weight ratio of 1:10 to 10:1.

3. A method according to claim 2 wherein the compound has the formula:

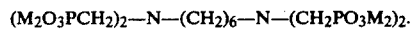

$(M_2O_3PCH_2)_2-N-(CH_2)_6-N-(CH_2PO_3M_2)_2$.

4. A method according to claim 3 where the styrene has a molecular weight of from 1,000 to 100,000.

5. A method according to claim 4 wherein the polystyrene is 90% sulfonated and has a molecular weight of about 70,000.

6. A method according to claim 1 wherein the material contained in said aqueous medium is lime or limestone.

7. A method according to claim 6 wherein the polystyrene and the compound are present in a weight ratio of 1:10 to 10:1.

8. A method according to claim 7 wherein the compound has the formula:

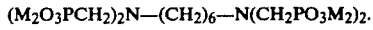

$(M_2O_3PCH_2)_2N-(CH_2)_6-N(CH_2PO_3M_2)_2$.

9. A method according to claim 8 wherein the polystyrene has a molecular weight of from 1,000 to 100,000.

10. A method according to claim 9 wherein the polystyrene is 90% sulfonated and has a molecular weight of about 70,000.

11. A method according to claim 10 wherein the ratio of polystyrene to compound is about 1:1.6 and the combination is added to said aqueous medium in the amount of from about 10 to 15 parts per million.

* * * * *